United States Patent Office 3,052,720
Patented Sept. 4, 1962

3,052,720
PREPARATION OF BIS(TRIFLUOROMETHYL) PHOSPHINOUS AMIDE
Giorgio Tesi and Catherine M. Douglas, Riverside, Calif., assignors to the United States of America as represented by the Secretary of the Navy
No Drawing. Filed July 6, 1961, Ser. No. 122,352
1 Claim. (Cl. 260—551)
(Granted under Title 35, U.S. Code (1952), sec. 266)

The invention herein described may be manufactured and used by or for the Government of the United States of America for governmental purposes without the payment of any royalties thereon or therefor.

The present invention relates to bis(trifluoromethyl)-phosphinous amide and more particularly to an improved method for preparing the compound.

The compound $(CF_3)_2PNH_2$, prepared by the process of the present invention, is important as an intermediate in a variety of reactions, such as in the preparation of polymeric bis(trifluoromethyl)phosphinic nitrides, which is disclosed in copending patent application, Serial No. 122,360, filed July 6, 1961, for Synthesis of Polymeric Bis(Perfluoroalkyl)Phosphinic Nitrides.

The compound, bis(trifluoromethyl)phosphinous amide, $(CF_3)_2PNH_2$, has been prepared by G. S. Harris (J. Chem. Soc. 1958, 512) by the following reactions:

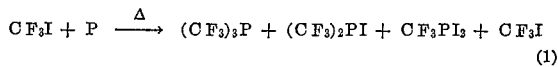

(Bennett, Emeleus, Haszeldine, J. Chem. Soc. 1953, 1565.)

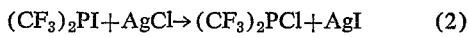

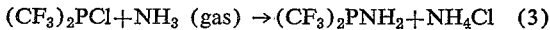

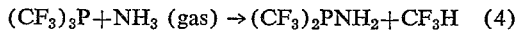

Both reactions (3) and (4) were in the vapor phase.

These previous methods have the disadvantages of: difficult and costly preparation of pure $(CF_3)_2PCl$; and, conversion of $(CF_3)_3P$, [which represents approximately 40–50% of the overall yield of reaction (1)], to $(CF_3)_2PNH_2$ yields only approximately 10% of product. These disadvantages are overcome by the improved process of the present invention.

It is an object of the present invention, therefore, to provide a new and improved method for the preparation of bis(trifluoromethyl)phosphinous amide.

It is another object of the invention to provide a method for complete conversion of $(CF_3)_3P$ to $(CF_3)_2PNH_2$.

Still another object of the invention is to provide the preparation of bis(trifluoromethyl)phosphinous amide at atmospheric pressure.

A further object of the invention is to provide an improved method for preparation of bis(trifluoromethyl)-phosphinous amide in greater yields than heretofore obtained.

Other objects and many of the attendant advantages of this invention will become readily appreciated as the same becomes better understood by reference to the following detailed description:

In the present invention, the mixture of products obtained from the reaction between $CF_3I$ and P is treated directly with liquid $NH_3$. Under these conditions the iodo compounds are readily converted to the corresponding amino compounds whereas $(CF_3)_3P$ is quantitatively transformed in $(CF_3)_2PNH_2$. The entire process can be summarized as follows:

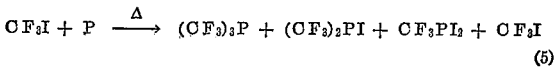

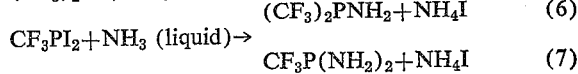

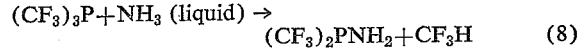

The bulk of the products obtained from the reaction between $CF_3I$ and P are treated with liquid ammonia, $NH_3$, in a container fitted with a stirring device, a Dry Ice condenser and an inlet. The container is kept all the time at atmospheric pressure in an atmosphere of nitrogen. The liquid amonia, $NH_3$, is added through the inlet very slowly at the beginning, cooling the flask at a temperature ranging from −40 to −60° C. and under vigorous stirring. The iodo compounds are rapidly converted to the corresponding amino compounds. An excess of $NH_3$ is then condensed in the flask and the temperature of the flask allowed to rise to the boiling point of $NH_3$, which, because of the large amount of $NH_4I$ dissolved, is in the vicinity of 0° C. The liquid ammonia solution is left refluxing for at least 24 hours. During this time the tris(trifluoromethyl)phosphine $(CF_3)_3P$, is converted quantitatively to bis(trifluoromethyl)phosphinous amide $(CF_3)_2PNH_2$, whereas the fluoroform, $CF_3H$, which is formed, can be recovered at the outlet of the Dry Ice condenser. After the reaction is completed the $(CF_3)_2PNH_2$ is recovered by fractional distillation as a pure material with an overall yield of approximately 70%. As pointed out previously, the whole operation is performed in an atmosphere of nitrogen to exclude the presence of air which would readily oxidize the trivalent phosphorous compounds.

With the present technique, the difficult fractionation of the reaction products obtained from the reaction between P and $CF_3I$ is avoided. The costly transformation of $(CF_3)_2PI$ to $(CF_3)_2PCl$ is also avoided and the yield of the conversion of tris(trifluoromethyl)phosphine $(CF_3)_3P$, to bis(trifluoromethyl)phosphinous amide $(CF_3)_2PNH_2$ is quantitative, thus greatly increasing the overall yield of the final product from 10% by the previous method to 70% by the present method.

Obviously many modifications and variations of the present invention are possible in the light of the above teachings. It is therefore to be understood that within the scope of the appended claim the invention may be practiced otherwise than as specifically described.

What is claimed is:

The preparation of the compound, bis(trifluoromethyl)-phosphinous amide, by the improved process of treating in one reaction with liquid ammonia and at temperatures ranging from −60° C. to 0° C. at atmospheric pressure the product compounds tris(trifluoromethyl)phosphine and iodobis(trifluoromethyl)phosphine from the reaction of trifluoromethyl iodide and phosphorus, the tris(trifluoromethyl)phosphine and the iodobis(trifluoromethyl)-phosphine reacting directly with the liquid ammonia to form the compound bis(trifluoromethyl)phosphinous amide and upon completion of this reaction the bis(trifluoromethyl)phosphinous amide being recovered by fractional distillation as a pure material with an overall yield of approximately 70% based on the trifluoromethyl iodide, the entire operation being performed in an inert atmosphere to prevent oxidation of the trivalent phosphorous compounds.

References Cited in the file of this patent

Harris: J. Chem. Soc. (London), pp. 512–519 (1958).